US012648053B2

(12) United States Patent (10) Patent No.: US 12,648,053 B2
Dellock et al. (45) Date of Patent: Jun. 2, 2026

(54) GRAPHENE/CARBON NANOSTRUCTURE HEATING ELEMENT

(71) Applicant: Ford Global Technologies, LLC, Dearborn, MI (US)

(72) Inventors: Paul Kenneth Dellock, Northville, MI (US); Alper Kiziltas, Sarikamis (TR); Stuart Salter, White Lake, MI (US); David Brian Glickman, Southfield, MI (US); Tom F. Boettger, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 908 days.

(21) Appl. No.: 17/399,327

(22) Filed: Aug. 11, 2021

(65) Prior Publication Data

US 2023/0051813 A1 Feb. 16, 2023

(51) Int. Cl.
| | |
|---|---|
| *B32B 9/00* | (2006.01) |
| *C01B 32/158* | (2017.01) |
| *C01B 32/182* | (2017.01) |
| *H01C 17/065* | (2006.01) |
| *H05B 3/14* | (2006.01) |
| *H05B 3/84* | (2006.01) |
| *B82Y 30/00* | (2011.01) |
| *B82Y 40/00* | (2011.01) |

(52) U.S. Cl.
CPC ............. *H05B 3/14* (2013.01); *C01B 32/158* (2017.08); *C01B 32/182* (2017.08); *H01C 17/0652* (2013.01); *H01C 17/0658* (2013.01); *H05B 3/84* (2013.01); *B82Y 30/00* (2013.01); *B82Y 40/00* (2013.01); *C01B 2202/22* (2013.01); *C01B 2204/04* (2013.01); *C01B*

*2204/22* (2013.01); *H05B 2203/013* (2013.01); *H05B 2214/02* (2013.01)

(58) Field of Classification Search
CPC ....... Y10T 428/30; B82Y 30/00; B82Y 40/00; Y10S 977/742; C01B 32/174; C01B 32/194; C01B 32/186
USPC .......................................................... 428/408
See application file for complete search history.

(56) References Cited

U.S. PATENT DOCUMENTS

| | | |
|---|---|---|
| 2007/0279182 A1 | 12/2007 | Kodas et al. |
| 2015/0249167 A1 | 9/2015 | Zhang et al. |
| 2018/0168000 A1* | 6/2018 | Sohn .......................... C03C 4/14 |

(Continued)

FOREIGN PATENT DOCUMENTS

| | | | | |
|---|---|---|---|---|
| CN | 105000595 | | 3/2017 | |
| WO | 2017082995 | | 5/2017 | |
| WO | WO 2018/073691 | * | 4/2018 | ........... C01B 32/184 |

OTHER PUBLICATIONS

WO 2020/163921 (Choucair), Graphene Complexes and Compositions Thereof Aug. 20, 2020.*

*Primary Examiner* — Daniel H Miller
(74) *Attorney, Agent, or Firm* — Vichit Chea; Carlson, Gaskey & Olds, P.C.

(57) ABSTRACT

An article includes a substrate and a resistance heating element bonded to the substrate. The resistance heating element is comprised of, by weight, 10 to 45% of graphene, 0.25 to 45% of carbon nanostructure (CNS) material different than the graphene, and a remainder of glass frit. The graphene and the CNS material include a coupling agent that bonds the graphene and the CNS material with at least the glass frit.

20 Claims, 2 Drawing Sheets

(56)         References Cited

U.S. PATENT DOCUMENTS

2019/0078007 A1*   3/2019   Zhang ..................... C09K 5/14
2019/0159303 A1*   5/2019   Zhao ...................... B82Y 99/00
2019/0161354 A1    5/2019   Bohm et al.
2019/0329491 A1*   10/2019  Yu ......................... B29C 64/165

* cited by examiner

GRAPHENE/CARBON NANOSTRUCTURE HEATING ELEMENT

BACKGROUND

Resistance heating elements, such as those used for defrosters on automobile rear windows, may be manufactured from a paste. The paste includes metallic silver, transition metal oxides, and glass frit, among other constituents, dispersed in an organic carrier. The paste may be deposited by silk-screening or other suitable technique onto a window. The paste is then heated to sinter and bond the silver and glass frit, thereby forming a continuous electrically conductive path.

SUMMARY

An article according to an example of the present disclosure includes a substrate and a resistance heating element bonded to the substrate. The resistance heating element is comprised of, by weight, 10% to 45% of graphene, 0.25% to 45% of carbon nanostructure (CNS) material different than the graphene, and a remainder of glass frit. The graphene and the CNS material includes a coupling agent bonding the graphene and the carbon nanostructure material with at least the glass frit.

In a further embodiment of any of the foregoing embodiments, the substrate is a glass window.

A further embodiment of any of the foregoing embodiments includes 20% to 30% of the graphene, 5% to 20% of the carbon nanostructure material, and the remainder of the glass frit.

In a further embodiment of any of the foregoing embodiments, the graphene has two to five atomic layers.

In a further embodiment of any of the foregoing embodiments, the CNS material includes carbon nanotubes.

In a further embodiment of any of the foregoing embodiments, the carbon nanotubes are linked together by carbon branches.

In a further embodiment of any of the foregoing embodiments, the coupling agent is selected from the group consisting of titanates, silanes, and combinations thereof.

In a further embodiment of any of the foregoing embodiments, the coupling agent is selected from the group consisting of titanates.

In a further embodiment of any of the foregoing embodiments, the coupling agent is titanium IV 2,2(bis 2-propenolatomethyl)butanolato, tris(dioctyl)phosphato-O.

In a further embodiment of any of the foregoing embodiments, the coupling agent is selected from the group consisting of silanes.

In a further embodiment of any of the foregoing embodiments, the glass frit has a melting temperature of 380° C. to 460° C.

A composition according to an example of the present disclosure includes by weight 40 to 80% of a carrier liquid, 10 to 45% of graphene, 0.25 to 7% of carbon nanostructure (CNS) material different than the graphene, 10 to 50% of glass frit, and a coupling agent configured to bond the graphene and the CNS material with the glass frit.

In a further embodiment of any of the foregoing embodiments, the carrier liquid includes at least one of butyl carbitol acetate, terpineol, or ethylene glycol.

The composition as recited in claim 13, further comprising a thickening agent including ethyl cellulose.

The composition as recited in claim 12, including 45 to 70 of the carrier liquid, 20 to 30% of the graphene, 1 to 5% of the carbon nanostructure material, and 10 to 30% of the glass frit.

In a further embodiment of any of the foregoing embodiments, the graphene has two to five atomic layers.

In a further embodiment of any of the foregoing embodiments, the CNS material includes carbon nanotubes that are linked together by carbon branches.

In a further embodiment of any of the foregoing embodiments, the coupling agent is selected from the group consisting of titanates.

In a further embodiment of any of the foregoing embodiments, the coupling agent is selected from the group consisting of silanes.

In a further embodiment of any of the foregoing embodiments, the glass frit has a melting temperature of 380° C. to 460° C.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
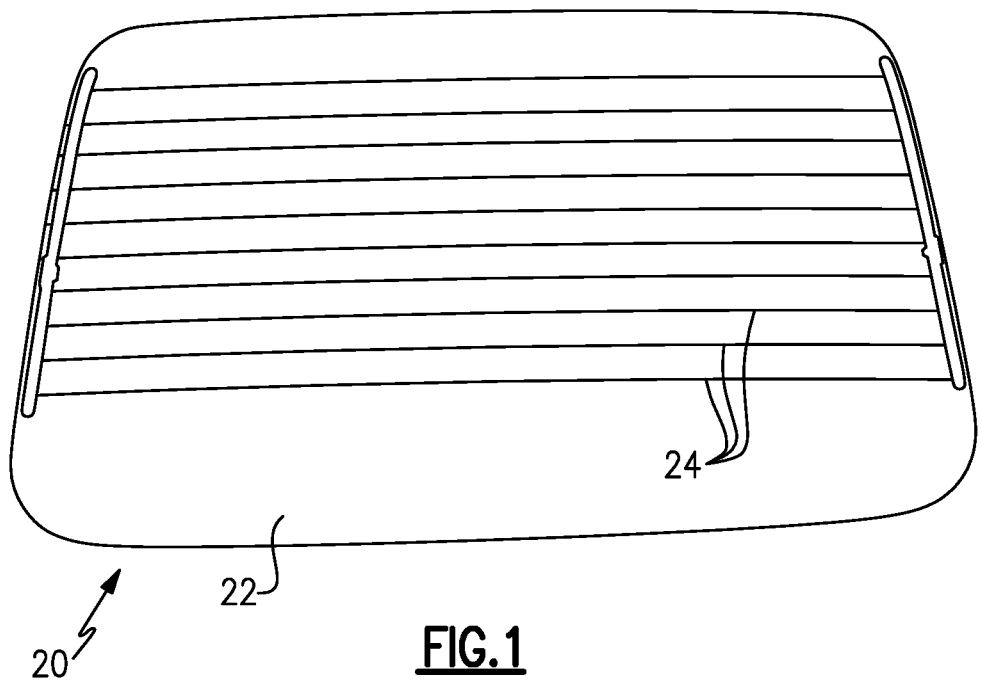
FIG. 1 illustrates an article that has heating elements formed from a paste that has graphene and carbon nanostructure material.

FIG. 1 schematically illustrates an article 20. In this example, the article 20 is a rear window for an automobile. It is to be understood, however, that the examples herein may be applied to other end-use products and are not limited to rear automobile windows.

The article 20 includes a substrate 22 and one or more resistance heating elements 24. In this example, the substrate 22 is a glass window and there are a plurality of resistance heating elements 24 in the form of elongated, relatively narrow parallel lines that are bonded on the substrate 22. As will be discussed below, the resistance heating elements 24 utilize graphene and carbon as conductive constituents rather than metallic silver.

Figure 2:
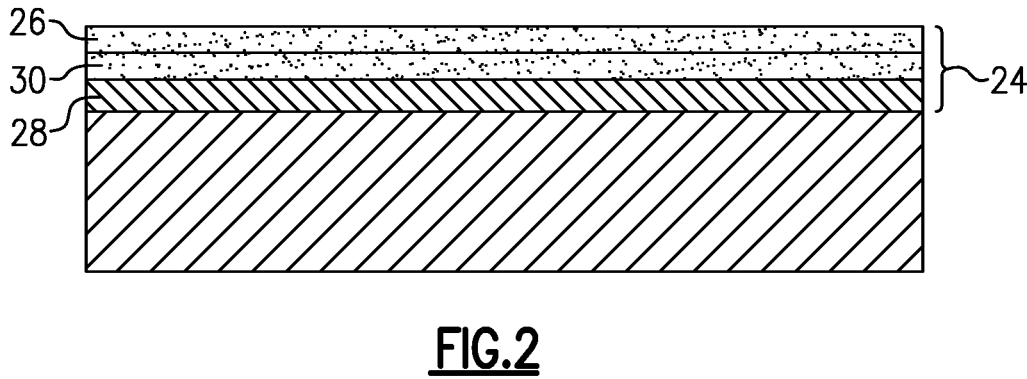
FIG. 2 illustrates a sectioned view of a portion of the article.

FIG. 2 illustrates a representative sectioned view of the article 20 through the substrate 22 and one of the resistance heating elements 24. In this example, the resistance heating element 24 includes a carbon layer 26, a bonded glass frit layer 28, and a carbon/glass layer 30 there between. The carbon in the carbon layer 26 and the carbon/glass layer includes graphene and carbon nanostructure (CNS) material, which will be discussed in more detail below.

Figure 3:
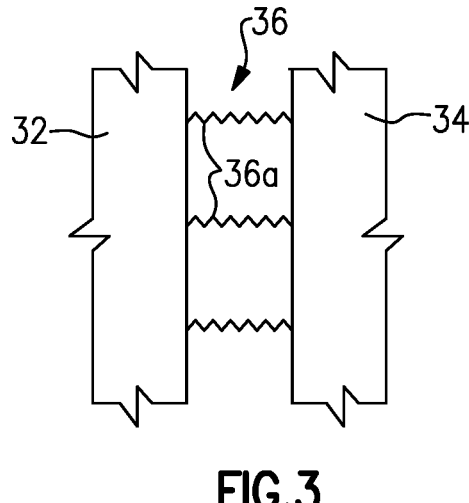
FIG. 3 illustrates a coupling agent.

The resistance heating element 24 is comprised of, by weight, 10% to 45% of graphene, 0.25% to 45% of CNS material (different than the graphene), and a remainder, such as 10% to 50%, of glass frit. The graphene and the CNS material include a coupling agent that bonds the graphene and the CNS material with at least the glass frit in the carbon/glass layer 30 and the glass frit layer 28. For example, FIG. 3 illustrates a portion of a carbon structure 32, such as the graphene or the CNS material, located adjacent a portion of a glass frit 34. Coupling agent 36 includes ligands 36a that bond the carbon structure 32 to the glass frit 34.

The coupling agent 36 is selected from titanates, silanes, or combinations thereof. In one example, the coupling agent 36 is titanium IV 2,2(bis 2-propenolatomethyl)butanolato, tris(dioctyl)phosphato-O, a form of which is available as LICA 12 from Kenrich Petrochemicals. One example silane coupling agent is available as BYK-C 8013 from BYK Chemicals.

The glass frit of the glass frit layer 28 is a relatively low-melting temperature glass. For example, in order to sinter and bond the resistance heating element 24 without over-heating the glass of the substrate 22, the glass frit has a melting temperature that is well below the melting temperature of the glass of the substrate. As an example, the glass of the substrate 22 is a soda glass and the glass frit has a melting temperature of 380° C. to 460° C.

Although graphene is known to be electrically conductive, mere incorporation of it into a heating element does not provide conductivity/resistance and durability that is on par with silver-based resistance heating elements. However, the types of carbon selected, the coupling agent, and the processing of the resistance heating elements 24 yield performance that is similar to silver-based elements.

Figure 4:
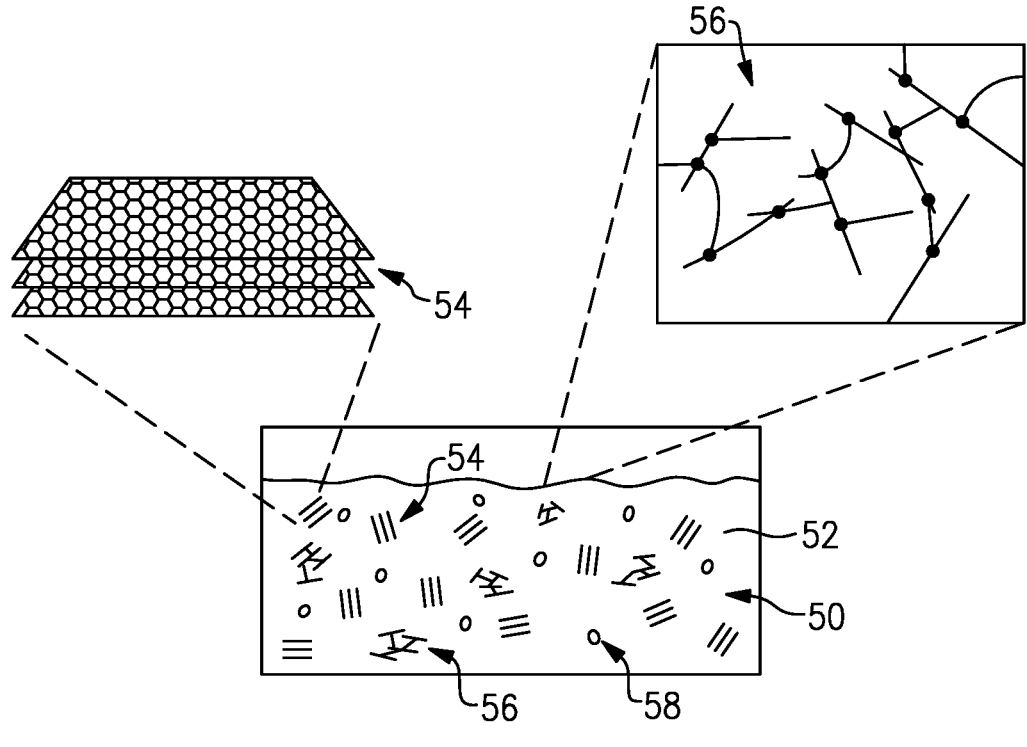
FIG. 4 illustrates a composition in the form of a paste.

FIG. 4 illustrates a paste 50 for use in a manufacturing process to make the resistance heating elements 24. It is to be appreciated that although the disclosed composition is demonstrated here by the example of the paste 50, the composition may be adapted for other processes besides silk screening. The composition of the paste 50, by weight, includes 40% to 80% of a carrier liquid 10% to 45% of graphene 54, 0.25% to 7% of CNS material 56, 10% to 50% of glass frit 58, and the coupling agent for boding the graphene 54 and the CNS material with the glass frit 58.

To make the paste 50, starting materials of graphene and CNS material are added to a high shear mixer along with the coupling agent. The starting graphene is in the form of graphene flakes that are about 5 to 33 micrometers in length in the 10 to 90 percentile range and contain approximately 6 to 10 graphene monolayers. As an example, graphene flakes are available under the name GrapheneBlack™ x3 from NanoXplore. The starting CNS material is in the form of flakes that contain a 3-D network of crosslinked carbon nanotubes. As an example, CNS material is available from Cabot under the name Athlos™ CNS. Under shear forces in the mixer, the graphene exfoliates into flakes that have 2 to 5 graphene monolayers (see FIG. 4), and the CNS material breaks into fragments that contain a branched network of carbon nanotubes (see FIG. 4). The mixing also coats the graphene and CNS material with the coupling agent. Following mixing, the coated CNS material may be dried (e.g., at approximately 150° C.) to remove moisture.

The coated graphene and CNS material is then mixed with the carrier liquid 52, most typically an organic medium, to produce an ink. For example, the carrier liquid includes at least one of butyl carbitol acetate, terpineol, or ethylene glycol, but is not limited thereto. In general, the carrier liquid will include an alcohol, ester of alcohol, including acetates and propionates, terpenes, such as pine oil, terpineol and the like, solutions of resins such as polymethacrylates, or solutions of ethyl cellulose in solvents such as pine oil and monobutyl ether of ethylene glycol monoacetate. The carrier liquid 52 may also include additional constituents, such as but not limited to, thickening agents and volatile liquids to promote rapid setting after printing to the substrate. One example thickening agent includes ethyl cellulose.

The glass frit 58 is then also mixed with the ink to form the paste 50. As an example, the glass frit 58 is, but is not limited to, lead-free glass that is available from such sources as Nippon Glass, Yek Glass, or Dragon Glass. In one example, the glass frit 58 is available from YEK Glass under the name YMF 001, which has a particle size of approximately 10 to 55 micrometers and a melting temperature of 440-460° C.

The paste 50 may, at least in some cases, be used as a drop-in replacement for silver paste in the process for making the heating elements 24. For instance, the process includes screen-printing through a 180 standard mesh screen onto a flat, un-formed rear window glass. Optionally, the printed composition may then be dried at about 150° C. The glass substrate and the printed paste are then heated in air at 650° C. for 2 to 5 minutes. After heating, the softened window glass is shaped by compression in a mold and then quenched by rapid cooling. The graphene, CNS material, and glass frit sinter and thereby bond to the glass substrate, creating is a continuous electrically conductive path which is now the resistance heating element 24. The carrier liquid and any emulsifiers are removed by vaporization and pyrolysis during the heating.

The coupling agent facilitates a strong bond between the graphene, the CNS material, and the glass frit, which enhances durability of the resistance heating element 24. The branched nanotubes of the CNS material and the graphene also facilitate the formation of the electrically conductive path. For instance, the flakes of branched carbon nanotubes from the CNS material occupy substantial volume and readily interconnect with the graphene flakes and with other flakes of branched carbon nanotubes, thereby forming a continuous electrical path that yields a conductivity/resistance in the heating element 24 that is on par with heating elements produced from silver paste. Additionally, the paste 50 may be less costly than a silver paste that has an equivalent amount of solids. For instance, graphene and CNS material have a density of 2.2 grams per cubic centimeter, which is approximately 20% of the density of silver. Thus, the paste 50 contains less graphene and CNS material on a per weight basis for the same volume of solver and thus yields a corresponding reduction of the paste 50 on a per weight basis in comparison to silver.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An article comprising:
    a substrate; and
    a resistance heating element bonded to the substrate, the resistance heating element being comprised of, by weight, 10% to 45% of graphene, 0.25% to 45% of carbon nanostructure (CNS) material different than the graphene, and a remainder of glass frit, the graphene and the CNS material including a coupling agent bonding the graphene and the carbon nanostructure material with at least the glass frit.

2. The article as recited in claim 1, wherein the substrate is a glass window.

3. The article as recited in claim 1, including 20% to 30% of the graphene, 5% to 20% of the carbon nanostructure material, and the remainder of the glass frit.

4. The article as recited in claim 1, wherein the graphene has two to five atomic layers.

5. The article as recited in claim 1, wherein the CNS material includes carbon nanotubes.

6. The article as recited in claim 5, wherein the carbon nanotubes are linked together by carbon branches.

7. The article as recited in claim 1, wherein the coupling agent is selected from the group consisting of titanates, silanes, and combinations thereof.

8. The article as recited in claim 7, wherein the coupling agent is selected from the group consisting of titanates.

9. The article as recited in claim 8, wherein the coupling agent is titanium IV 2,2(bis 2-propenolatomethyl)butanolato, tris(dioctyl)phosphato-O.

10. The article as recited in claim 7, wherein the coupling agent is selected from the group consisting of silanes.

11. A composition comprising, by weight:
40 to 80% of a carrier liquid;
10 to 45% of graphene;
0.25 to 7% of carbon nanostructure (CNS) material different than the graphene;
10 to 50% of glass frit; and a coupling agent configured to bond the graphene and the CNS material with the glass frit.

12. The composition as recited in claim 11, wherein the carrier liquid includes at least one of butyl carbitol acetate, terpineol, or ethylene glycol.

13. The composition as recited in claim 12, further comprising a thickening agent including ethyl cellulose.

14. The composition as recited in claim 11, including 45 to 70 of the carrier liquid, 20 to 30% of the graphene, 1 to 5% of the carbon nanostructure material, and 10 to 30% of the glass frit.

15. The composition as recited in claim 14, wherein the graphene has two to five atomic layers.

16. The composition as recited in claim 15, the CNS material includes carbon nanotubes that are linked together by carbon branches.

17. The composition as recited in claim 16, wherein the coupling agent is selected from the group consisting of titanates.

18. The composition as recited in claim 16, wherein the coupling agent is selected from the group consisting of silanes.

19. The composition as recited in claim 16, wherein the glass frit has a melting temperature of 380° C. to 460° C.

20. The article as recited in claim 1, including 20% to 30% of the graphene, 5% to 20% of the carbon nanostructure material, and the remainder of the glass frit, CNS material includes carbon nanotubes, and the graphene has two to five atomic layers.

* * * * *